(12) United States Patent
Abe et al.

(10) Patent No.: US 7,417,580 B2
(45) Date of Patent: Aug. 26, 2008

(54) OBJECT DETECTION SYSTEM AND OBJECT DETECTION METHOD

(75) Inventors: Kyoichi Abe, Susono (JP); Setsuo Tokoro, Susono (JP); Koji Suzuki, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 176 days.

(21) Appl. No.: 10/571,427

(22) PCT Filed: Sep. 9, 2004

(86) PCT No.: PCT/IB2004/002927

§ 371 (c)(1),
(2), (4) Date: Mar. 10, 2006

(87) PCT Pub. No.: WO2005/024460

PCT Pub. Date: Mar. 17, 2005

(65) Prior Publication Data

US 2007/0080850 A1    Apr. 12, 2007

(30) Foreign Application Priority Data

Sep. 11, 2003    (JP) ............................. 2003-320063

(51) Int. Cl.
*G01S 13/00* (2006.01)
(52) U.S. Cl. ........................... 342/27; 342/70; 342/179; 342/174; 356/399
(58) Field of Classification Search ............ 342/70, 342/27, 52–55, 85, 93–94, 174, 179; 356/4.01–5.15, 356/399
See application file for complete search history.

(56) References Cited

U.S. PATENT DOCUMENTS 6,492,935 B1    12/2002    Higuchi (Continued)

FOREIGN PATENT DOCUMENTS

DE    101 33 945 A1    2/2003

(Continued)

OTHER PUBLICATIONS

Japanese Office Action dated Oct. 26, 2006.

*Primary Examiner*—Thomas H. Tarcza
*Assistant Examiner*—Timothy A Brainard
(74) *Attorney, Agent, or Firm*—Finnegan, Henderson, Farabow, Garrett & Dunner, LLP

(57) ABSTRACT

An object detection system includes a radar detection means (2), an image detection means (3), and a collating means (4). The collating means (4) performs a collation between an object detected by the radar detection means (2) in a present collation and an object that has been determined as being detected by the radar detection means (2) and the image detection means (3) in a previous collation (S 10, S 11), further performs a collation between an object detected by the image detection means (3) in a present collation and an object that has been determined as being detected by the radar detection means (2) and the image detection means (3) in the previous collation (S 12, S 13) when it is determined that the identical object is detected by the radar detection means (2) and the image detection means (3) in the previous collation. Then the collating means (4) determines whether the radar detection means (2) and the image detection means (3) detect the identical object based on the collations (S 14).

20 Claims, 6 Drawing Sheets

U.S. PATENT DOCUMENTS

| | | | |
|---|---|---|---|
| 6,590,521 B1 * | 7/2003 | Saka et al. | 342/70 |
| 2001/0031068 A1 | 10/2001 | Ohta et al. | |
| 2003/0011509 A1 * | 1/2003 | Honda | 342/70 |
| 2003/0201929 A1 * | 10/2003 | Lutter et al. | 342/52 |
| 2005/0021201 A1 * | 1/2005 | Klotz et al. | 701/35 |

FOREIGN PATENT DOCUMENTS

| | | |
|---|---|---|
| DE | 10133945 A1 * | 2/2003 |
| JP | 07-125567 | 5/1995 |
| JP | 2001-99930 | 4/2001 |
| JP | 2003-84064 | 3/2003 |
| JP | 2004-117071 | 4/2004 |
| JP | 2004-153627 | 5/2004 |
| JP | 2004-2652-09 | 9/2004 |
| JP | 2005-25458 | 1/2005 |
| JP | 2005-71204 | 3/2005 |

* cited by examiner

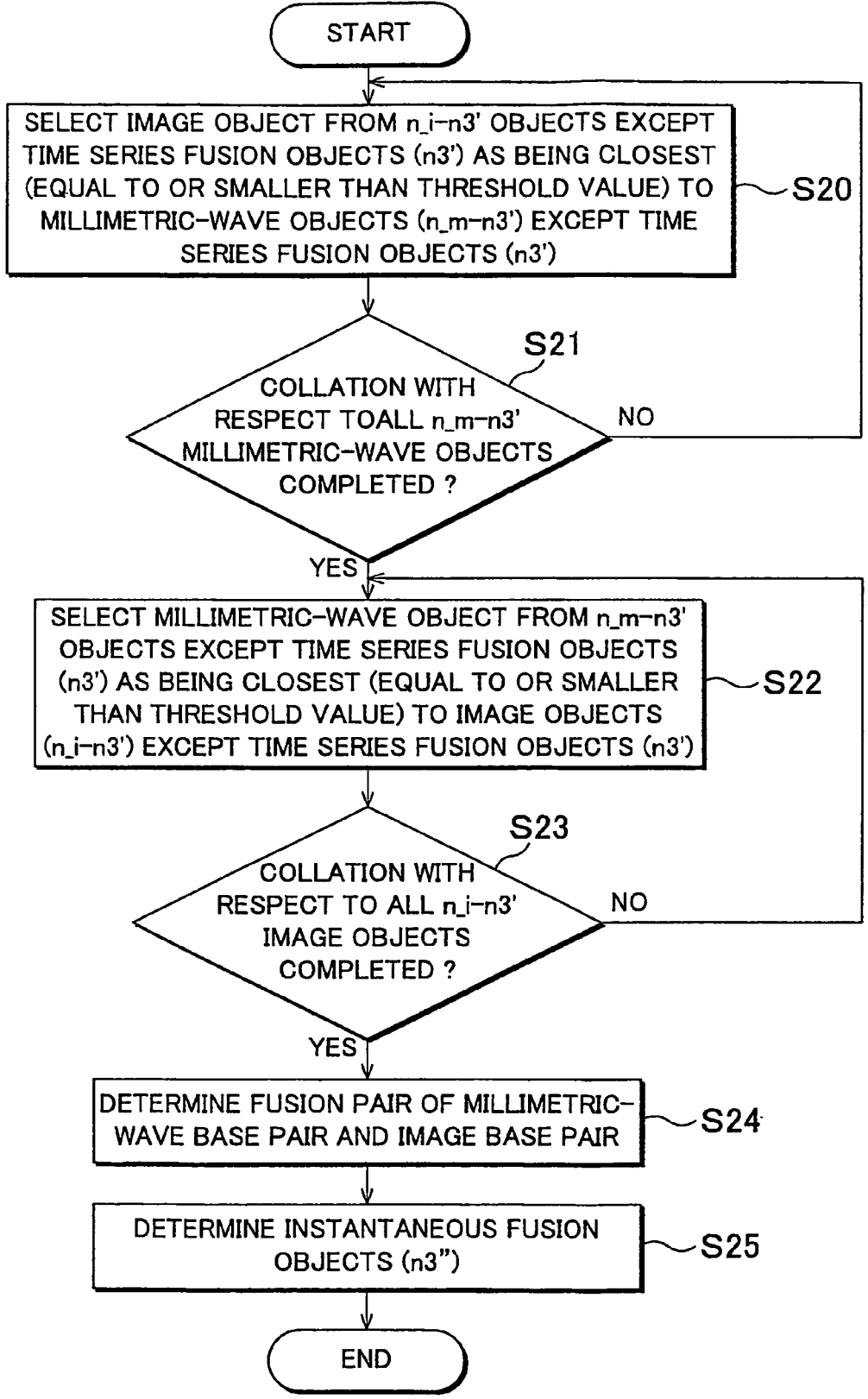

OBJECT DETECTION SYSTEM AND OBJECT DETECTION METHOD

BACKGROUND OF THE INVENTION

1. Field of Invention

The invention relates to an object detection system that detects an object using radar and images.

2. Description of Related Art

Recently an operation support system, for example, a collision avoidance control system, an adaptive cruise control system, a tracking control system and the like has been increasingly developed. The detection of an object (obstruction) such as a preceding vehicle is essential for the operation support system. An object detection system disclosed in publications JP-A-2003-84064 and JP-A-7-125567 as below includes two detection units, for example, a radar such as a laser radar, and a stereo camera that shoots an image. The object detection system performs collation between detection results of the radar and the detected image. The preceding object is detected based on the aforementioned collation results.

In the generally employed object detection system using two kinds of detection units, the respective detection results of those detection units each obtained instantaneously are collated. Deterioration in accuracy of at least one of those detection units may interfere with accurate collating operation. The detection accuracy of the aforementioned object detection system is likely to be deteriorated even if two different detection units are employed. Accordingly, such system may mistakenly detect the object or fail to detect the object.

SUMMARY OF THE INVENTION

It is an object of the invention to provide an object detection system capable of detecting an object with high accuracy.

An object detection system according to an aspect of the invention includes a radar detection means that detects an object using a radar, an image detection means that detects an object using an image, and a collating means that performs collation between a detection result of the radar detection means and a detection result of the image detection means so as to determine whether an identical object is detected by the radar detection means and the image detection means. The collating means performs a collation between an object detected by the radar detection means in a present collation and an object that has been determined as being detected by the radar detection means and the image detection means in a previous collation, and further performs a collation between an object detected by the Image detection means in a present collation and an object that has been determined as being detected by the radar detection means and the image detection means in the previous collation when it is determined that the identical object is detected by the radar detection means and the image detection means in the previous collation. Then the collating means determines whether the radar detection means and the image detection means detect the identical object based on the first and the second collations.

According to another aspect of the invention, in a method of detecting an object in an object detection system including a radar detection means that detects an object using a radar, an image detection means that detects an object using an image, and a collating means that performs collation between a detection result of the radar detection means and a detection result of the image detection means so as to determine whether an identical object is detected by the radar detection means and the image detection means, a first collation is performed between an object detected by the radar detection means in a present collation and an object that has been determined as being detected by the radar detection means and the image detection means in a previous collation, and a second collation is performed between an object detected by the image detection means in a present collation and an object that has been determined as being detected by the radar detection means and the image detection means in the previous collation when it is determined that the identical object is detected by the radar detection means and the image detection means in the previous collation. It is then determined whether the radar detection means and the image detection means detect the identical object based on the first and the second collations.

In the object detection system and object detection method, the object is detected by the radar detection means and the image detection means. The collating means of the object detection system and object detection method performs collation between detection results of the radar detection means and detection results of the image detection means at a predetermined time interval. If it is determined that the same object is detected by the aforementioned two detection units based on the results of the previous collation, the present collation is performed using the previous collation results. More specifically, the collating means performs collation between the object detected by the two detection units in the previous collation and the objects presently detected by the radar detection means, and between the object detected by the two detection units in the previous collation and the objects presently detected by the image detection means. Then it is determined whether the identical object is detected by those two detection units based on results of collation of the previous collation results with those of the object presently detected by the radar detection means and the image detection means. The detection results of the two detection units are not directly collated with each other, but each detection results of the two detection units is time-series collated using the previous collation results. This may improve the detection accuracy and stabilize the detection compared with the generally employed object detection system in which instantaneous detection results are collated. Even if the accuracy of at least one of those two detection units is deteriorated instantaneously, the collation may be performed using the previous collation results. Accordingly the detection results of the two detection units may be easily collated.

A millimeter-wave radar, laser radar and the like may be used as the radar detection means. A stereo camera may be used as the image detection means.

In the object detection system and object detection method according to the aspect of the invention, the collating means performs a collation between objects detected by the radar detection means in the present detection, which are obtained by excluding the object determined as have been detected by the radar detection means and the image detection means, and objects detected by the image detection means in the present detection, which are obtained by excluding the object determined as have been detected by the radar detection means and the image detection means such that it is determined whether the identical object is detected by the radar detection means and the image detection means.

In the case where it is determined that the identical object is detected by the two detection units in the present collation using the previous collation results, the determined object is excluded from the objects presently detected by the radar detection means and the image detection means, respectively so as to be collated. It is determined whether there is the identical object among those presently detected by the two detection units. In the object detection system and object detection method, instantaneous collation is performed between the two detection units that have been instantaneously obtained by the two detection units in consideration with the time-series collation results. Accordingly the object detection system makes it possible to collate objects that have been presently detected reliably.

The object detection system and object detection method according to the invention performs the time-series collation using the previous collation results so as to detect the object with high accuracy.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 is a flowchart representing an instantaneous collating process executed in the obstruction detection system as shown in FIG. 1.

DETAILED DESCRIPTION OF PREFERRED EMBODIMENT

Figure 1:
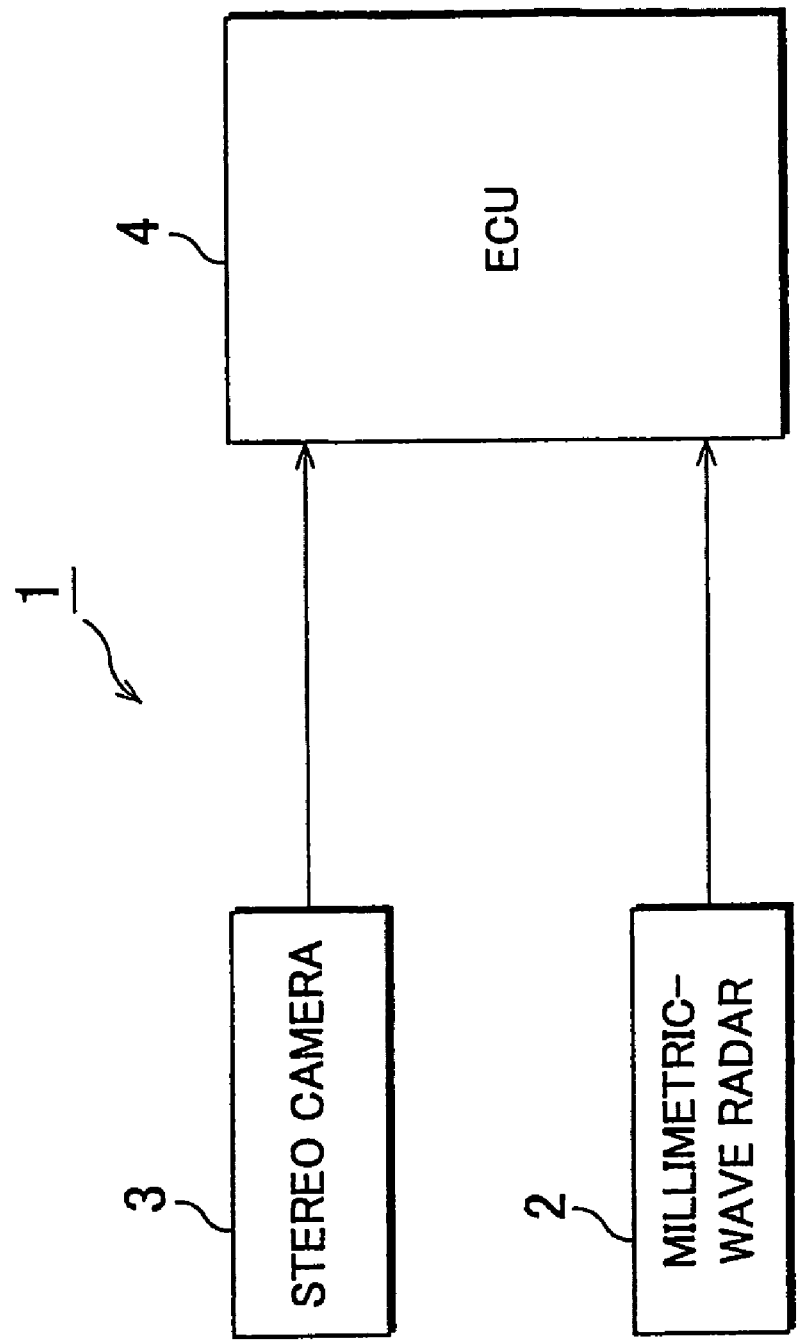
FIG. 1 is a view that shows a structure of an obstruction detection system as an embodiment according to the invention.

An embodiment of the object detection system according to the invention will be described referring to the drawings.

In this embodiment, the object detection system according to the invention is applied to an obstruction detection system provided in a vehicle so as to detect an obstruction that precedes the vehicle. The obstruction detection system in this embodiment is provided with two detection units, that is, a millimeter-wave radar and a stereo camera.

Referring to FIG. 1, an obstruction detection system 1 will be described. FIG. 1 shows a structure of the obstruction detection system according to this embodiment The obstruction detection system 1 is provided in a vehicle to detect an obstruction, that is, a running vehicle or the like that precedes the vehicle. The obstruction detection system 1 functions in providing obstruction information to the operation support system, for example, a collision avoidance control system, an adaptive cruise control system, a tracking control system and the like, which requires the information with respect to the preceding obstruction. In the obstruction detection system 1, each detection results of the two detection units is time-series collated with the previous collation results. Then instantaneous collation is performed using the present detection results obtained by excluding the time-series collation results therefrom such that the obstruction which precedes the vehicle is identified with high accuracy. The obstruction detection system 1 is provided with a millimeter-wave radar 2, a stereo camera 3, and an ECU 4 Electronic Control Unit). The obstruction detection system 1 may be provided independently from the operation support system. That is, it may be structured to transmit the detected obstruction information to the operation support system. Alternatively the obstruction detection system 1 may be assembled with the operation support system.

In this embodiment, the millimeter-wave radar 2 corresponds with the radar detection means, the stereo camera 3 corresponds with the image detection unit, and the ECU 4 corresponds with the collating unit.

In this embodiment, a millimetric-wave object refers to an object detected by the millimeter-wave radar 2, and an image object refers to an object detected by the stereo camera 3. A fusion object refers to the object identified as the one that has been detected by the millimeter-wave radar 2 and the stereo camera 3 through collation between the millimetric-wave objects and the image objects, and serves as the obstruction information supplied by the obstruction detection system 1. An independent millimetric-wave object represents the object that is detected only by the millimeter-wave radar 2. In other words, the independent millimetric-wave object is obtained by excluding the fusion object from the millimetric-wave objects. An independent image object represents the object that is detected only by the stereo camera 3. In other words, the independent image object is obtained by excluding the fusion object from the image objects. The respective objects exhibit the information with respect to the distance between the vehicle and the preceding obstruction, the relative speed of the obstruction with respect to the vehicle speed, the angle defined by the obstruction and the running direction of the vehicle information of the lateral position) for determining the position of the obstruction with respect to the vehicle.

The millimeter-wave radar 2, radar for detecting an object using millimetric wave, is attached in the center of a front surface of the vehicle. The millimeter-wave radar 2 scans the millimetric wave on the horizontal plane so as to be emitted from the vehicle forward, and receives the reflected millimetric wave. The millimeter-wave radar 2 measures the time period elapsing from the emission to the receipt of the millimetric wave such that the distance from the front end of the vehicle to the preceding object is calculated. The millimeter-wave radar 2 further calculates a relative speed of the vehicle with respect to that of the preceding object using Doppler Effect. The millimeter-wave radar 2 detects the direction of the millimetric wave that reflects most intensely, based on which an angle defined by the traveling direction of the vehicle and that of the preceding object is calculated. The millimeter-wave radar 2 is capable of detecting the object upon receipt of the reflecting millimetric wave. At every receipt of the reflecting millimetric wave, therefore, one millimetric object is obtained. The millimeter-wave radar 2 serves to calculate the distance, the relative speed, and the angle. However, the ECU 4 may be structured to calculate those values based on detection results of the millimeter wave radar 2.

The millimeter-wave radar 2 is capable of detecting the distance and the relative speed with relatively higher accuracy, but detecting the angle with relatively lower accuracy. As the millimeter-wave radar 2 calculates the distance based on the time elapsing from emission of the millimetric wave to reflection thereof, the accuracy in the calculated distance is relatively higher. As the relative speed is calculated using Doppler effect, the resultant value of the relative speed exhibits high accuracy. The millimeter-wave radar 2 fails to identify the point at which the millimetric wave reflects most intensely in the width direction of the object. Therefore, the position in the width direction (lateral position) is likely to fluctuate, reducing accuracy in the angle.

The stereo camera 3 includes two sets of CCD cameras (not shown), which are arranged apart at a distance of approximately several 10 cms in the horizontal direction. The stereo camera 3 is also attached in the center of the front surface of the vehicle. The stereo camera 3 transmits the respective image data shot by those two CCD cameras to an image processing portion (not shown). The image processing portion may be assembled with the stereo camera 3 or formed within the ECU 4.

The image processing portion identifies the object based on the respective image data, and obtains the positional information with respect to the object. The stereo camera 3 is capable of detecting the object when the object is identified based on two image data. At every identification of the object, one image object is obtained. The image processing portion calculates the distance from the front end of the vehicle to the preceding object by triangulation using the difference in views of the object between two image data. The image processing portion calculates the relative speed based on the change in the calculated distance as an elapse of time. The image processing portion detects both ends of the detected object in the width direction such that each angle defined by the traveling direction of the vehicle and the respective ends of the object is calculated. Accordingly the lateral positional information of the image object includes two types of angle information with respect to both ends of the object in the width direction.

Each detection result of the stereo camera 3 with respect to the distance and the relative speed exhibits relatively lower accuracy but the detection result with respect to the angle exhibits relatively higher accuracy. As both ends of the object in the width direction can be detected with high accuracy based on the left and right image data, the detection result with respect to the angle may exhibit high accuracy. However, as the image data are supplied from left and right CCD cameras several 10 cms apart, the triangulation is performed at substantially acute angle for calculating the distance. Accordingly, each accuracy of the distance and the relative speed may be reduced.

The ECU 4, that is, electronic control unit, includes a CPU (Central Processing Unit), a ROM (Read Only Memory), a RAM (Random Access Memory), and the like. The ECU 4 is connected with the millimeter-wave radar 2 and the stereo camera 3. The ECU 4 receives data of the millimetric-wave object from the millimeter-wave radar 2, and the image object from the stereo camera 3. Then the ECU 4 performs collation between the previous collation results (previous fusion objects) and the present millimetric-wave objects and the image objects received in the present collation, respectively at a predetermined time interval based on the master clock of the CPU so as to obtain the present fusion objects. When the image processing portion is provided in the ECU 4, the image data are received by the ECU 4 from the stereo camera 3 such that the image object is derived from the image data.

The ECU 4 executes the time-series collation between the previous fusion objects (n3 pre), and present millimetric-wave objects (n m) and present image objects (n i) both derived from the present collation, respectively so as to detect time-series fusion objects (n3'). The ECU 4 then executes the instantaneous collation between the millimetric-wave objects (n m−n3') obtained by excluding the time-series fusion objects, and the image objects (n i−n3') obtained by excluding the time-series fusion objects so as to detect instantaneous fusion objects (n3"). The time-series fusion objects (n3') are added to the instantaneous fusion objects (n3") to set the present fusion objects (n3=n3'+n3") in the present collation. The ECU 4 further sets the present millimetric-wave objects which have not been selected as the fusion object to independent millimetric-wave objects (n1=n m−n3), and the present image objects which have not been selected as the fusion object to independent image objects (n2=n i−n3).

Figure 2:
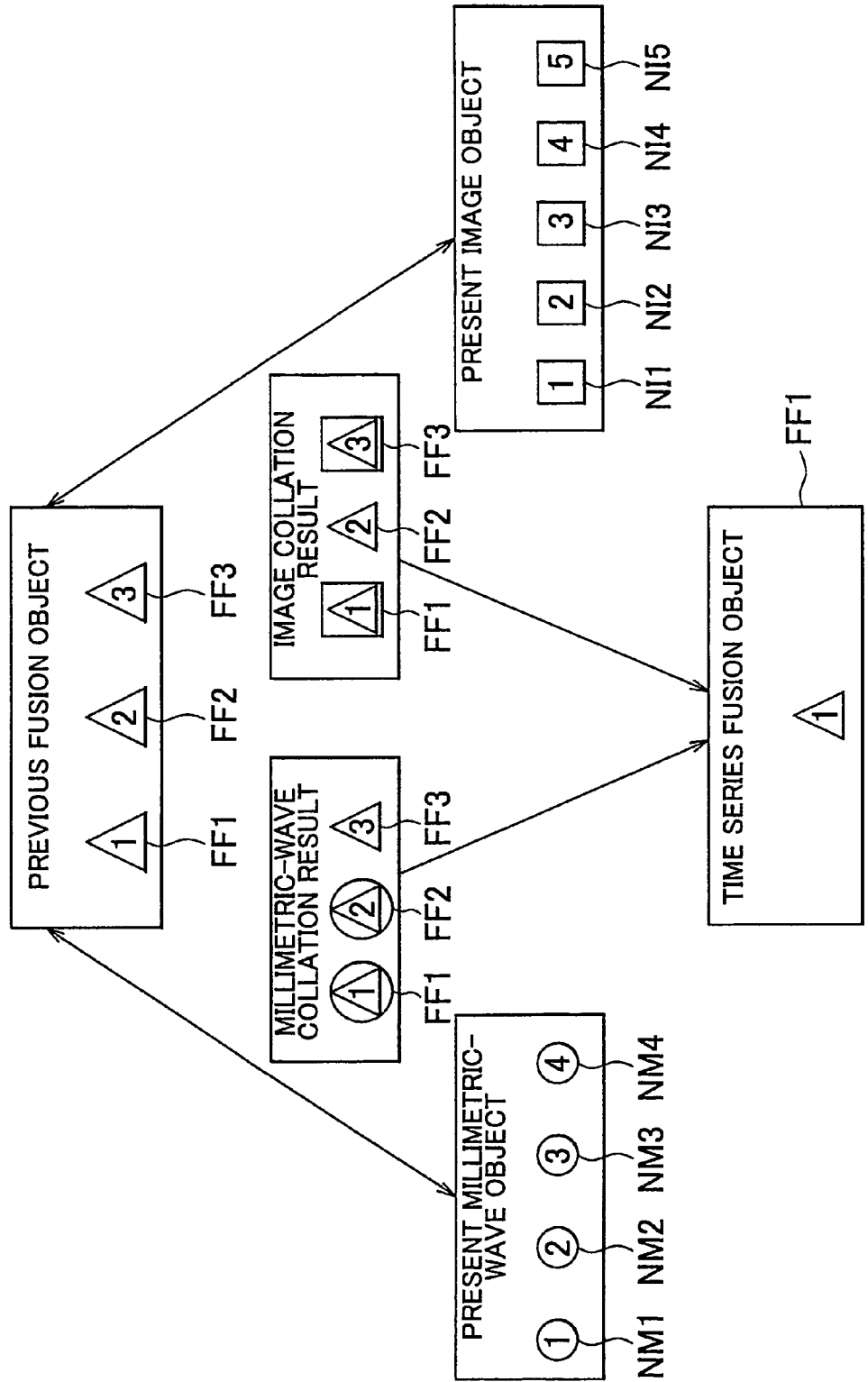
FIG. 2 is an explanatory view representing the time-series collation between the previous fusion objects and the present millimetric-wave objects and between the previous fusion objects and the present image objects in the obstruction detection system as shown in FIG. 1.

Referring to FIG. 2, the time-series collation executed in the ECU 4 will be described. FIG. 2 represents the time-series collation between the previous fusion objects, and the present millimetric-wave objects and the present image objects, respectively in an obstruction detection system. In an example shown in FIG. 2, three previous fusion objects FF1 to FF3 are obtained in the previous collation, four present millimetric-wave objects NM1 to NM4 are obtained in the present detection performed by the millimeter-wave radar 2, and five present image objects NI1 to NI5 are obtained in the present detection performed by the stereo camera 3.

In the case where n3 pre previous fusion objects are obtained in the previous collation, the ECU 4 executes collation between the previous fusion objects with high possibility of being detected as the fusion object in the present collation, and n m millimetric-wave objects detected by the millimeter-wave radar 2 in the present detection and n i image objects detected by the stereo camera 3 in the present detection, respectively.

The ECU 4 fetches each of those n3 pre previous fusion objects so as to be collated with those n m present millimetric-wave objects sequentially such that it is determined whether there is the present millimetric-wave object with high similarity to the fetched previous fusion object. In the present collation, the similarity of each of the n m present millimetric-wave objects to each of the previous fusion objects is calculated using the formula for obtaining similarity of the millimetric-wave objects. The present millimetric-wave object with the highest similarity is then selected. The millimetric-wave similarity formula is used to calculate the similarity by weighting those values of the distance, relative speed, and angle of the respective present millimetric-wave objects. In the formula, the distance and the relative speed each detected by the millimeter-wave radar 2 with higher accuracy are heavily weighted, and the angle with lower accuracy is lightly weighted. If the similarity value of the selected present millimetric-wave object is equal to or higher than a threshold value (used for determining the similarity, based on which coincidence in the object is determined), it is determined that the present millimetric-wave object is identical to the fetched previous fusion object. As a result of the millimetric-wave object collation, the previous fusion object is marked. The ECU 4 executes the collation of the present millimetric-wave objects with respect to the previous fusion objects repeatedly by n3 pre times.

In the example shown in FIG. 2, there is the present millimetric-wave object having the higher similarity to the previous fusion object FF1. As a result of the millimetric-wave object collation, the previous fusion object FF1 is marked. Also there is the present millimetric-wave object having the higher similarity to the previous fusion object FF2. As a result of the millimetric-wave object collation, the previous fusion object FF2 is marked. There is no present millimetric-wave object having higher similarity to the previous fusion object FF3. As a result of the millimetric-wave object collation, the previous fusion object FF3 is not marked.

Each of the n3 pre previous fusion objects is fetched so as to be collated with the n i present image objects sequentially in the ECU 4, and it is determined whether there is the present image object having higher similarity to the fetched previous fusion object. In the aforementioned collation, each similarity of the n i present image objects to the previous fusion objects is calculated using the image similarity formula so as to select the present image object having the highest similarity. The image similarity formula is used to calculate the similarity by weighting those values of the distance, relative speed, and angle of the respective present image objects. In the formula, the angle detected by the stereo camera 3 having higher accuracy is heavily weighted, and the distance and the relative speed with lower accuracy are lightly weighted. If the similarity value of the selected present image object is equal to or higher than the threshold value, it is determined that the present image object is identical to the fetched previous fusion object. As a result of the image object collation, the previous fusion object is marked. The ECU 4 executes the collation of the present image objects with respect to the previous fusion objects repeatedly by n3 pre times.

Referring to the example shown in FIG. 2, there is the present image object having higher similarity to the previous fusion object FF1, the previous fusion object FF1 is marked as a result of the image object collation. There is no present image object having higher similarity to the previous fusion object FF2, the fusion object FF2 is not marked. There is the present image object having higher similarity to the previous fusion object FF3, the previous fusion object FF3 is marked.

The ECU 4 then performs comparison of the results between the millimetric-wave object collation and the image object collation so as to select the previous fusion object that is marked in both results. The selected previous fusion object is set as the time-series fusion object in which the information of the distance and the relative speed is set based on the data of the present millimetric-wave object and the information of the angle is set based on the data of the present image object. The number of the time-series fusion objects is equal to or smaller than that of the previous fusion objects.

Referring to the example shown in FIG. 2, in the results of the millimetric-wave object collation, the previous fusion objects FF1 and FF2 are marked with circle. In the results of the image object collation, the previous fusion objects FF1 and FF3 are marked with square. As a result, only the previous fusion object FF1 is selected as the time-series fusion object.

Figure 3:
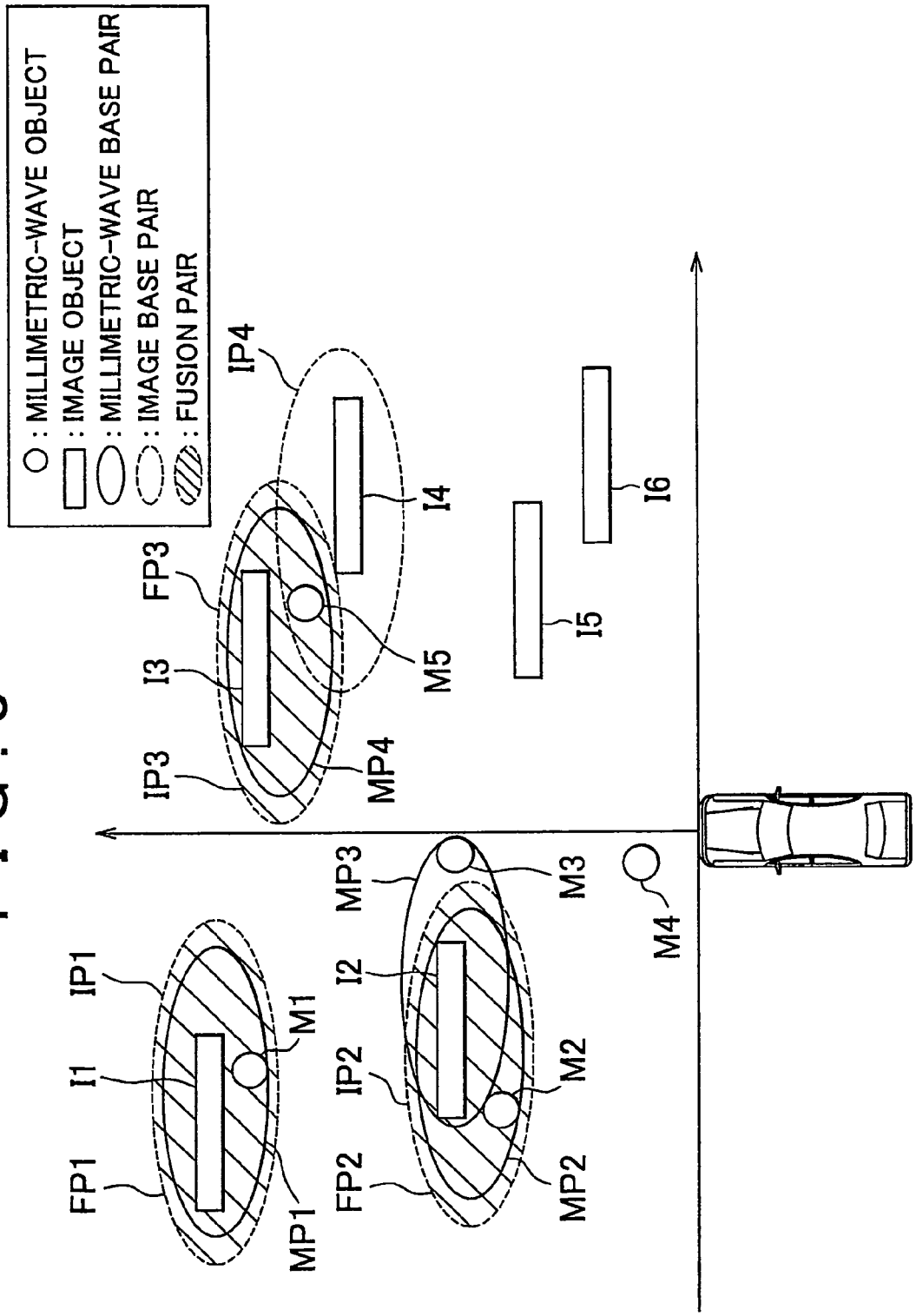
FIG. 3 is an explanatory view representing the instantaneous collation between the millimetric-wave objects and the image objects each obtained by excluding the time-series fusion objects therefrom in the obstruction detection system as shown in FIG. 1.

The instantaneous collation executed in the ECU 4 will be described referring to FIG. 3. FIG. 3 represents the instantaneous collation between the millimetric-wave objects except the time-series fusion objects and the image objects except the time-series fusion objects in the obstruction detection system. Referring to the example of FIG. 3, five millimetric-wave objects M1 to M5 are detected by the millimeter-wave radar 2 except the time-series fusion objects, and six image objects I1 to I6 are detected by the stereo camera 3 except the time-series fusion objects.

In the ECU 4, n3' time-series fusion objects are excluded from n m present millimetric-wave objects derived from the detection results of the millimeter-wave radar 2. Each one of the present millimetric-wave objects (n m−n3') is fetched as a reference for the purpose of performing the collation with respect to the millimetric-wave object Then n i−n3' image objects are collated with respect to the fetched millimetric-wave object sequentially, and only one image object that is closest to the millimetric-wave object is selected. In this case, collation is executed with respect to the distance between the object and the vehicle, and the angle defined by the object and the traveling direction of the vehicle as well as the relative speed of the object with respect to the vehicle if required. In case of the distance collation, the distance difference (for example, several meters) is set as the threshold value in accordance with the accuracy of the millimeter-wave radar 2. When the difference between the distance from the millimetric-wave object to the vehicle and the distance from the closest image object to the vehicle is equal to or larger than the threshold value, the closest image object cannot be selected. In case of the angle collation, the angle difference (for example, several degrees) is set as the threshold value in accordance with the accuracy of the millimeter-wave radar 2. When the difference between the angle defined by the millimetric-wave object and the traveling direction of the vehicle, and the angle defined by the closest image object and the traveling direction of the vehicle is equal to or larger than the threshold value, the closest image object cannot be selected. When the closest image object is selected, the millimetric-wave object and the selected image object as being closest thereto are stored as the millimetric-wave base pair in the ECU 4. The ECU 4 executes the aforementioned collation with respect to the millimetric-wave objects repeatedly by n m−n3' times.

In the example shown in FIG. 3, when the millimetric-wave object M1 is fetched as the reference, an image object I1 is selected such that a millimetric-wave base pair MP1 is determined. When the millimetric-wave object M2 is fetched as the reference, an image object I2 is selected such that a millimetric-wave base pair MP2 is determined. When a millimetric-wave object M3 is fetched as the reference, an image object I2 is selected such that a millimetric-wave base pair MP3 is determined. When the millimetric-wave object M4 is fetched as the reference, any one of the image objects I1 to I6 cannot be selected to form the millimetric-wave base pair because each distance between the respective image objects I1 to I6 and the millimetric-wave object M4 exceeds the threshold value. When the millimetric-wave object M% is fetched as the reference, an image object I3 is selected such that a millimetric-wave base pair MP4 is determined.

In the ECU 4, the n i present image objects are derived from detection results of the stereo camera 3. The n3' time-series fusion objects are excluded from those present image objects (n i−n3'), each of which is fetched such that the collation with respect to the image object is executed. Each of the millimetric-wave objects (n m−n3') is collated with the fetched image object as the reference sequentially so as to select only one millimetric-wave object that is closest to the reference image object. In this case, like the collation with respect to the millimetric-wave objects, collation is performed with respect to the distance between the object and the vehicle, and the angle defined by the object and the traveling direction of the vehicle. Each difference in the aforementioned distance and the angle is set as the threshold value in accordance with the accuracy in the stereo camera 3. In the ECU 4, in the case where the difference in the distance between the reference image object and the millimetric-wave object closest thereto is equal to or larger than the threshold value, or the difference in the angle is equal to or larger than the threshold value, the millimetric-wave object considered as being closest to the reference image object cannot be selected. When the closest millimetric-wave object is selected, the reference image object and the millimetric-wave object closest thereto are stored in the ECU 4 as an image object base pair. The aforementioned collation with respect to the image objects is repeatedly executed by n i−n3' times.

In the example shown in FIG. 3, when the image object I1 is fetched as the reference, the millimetric-wave object M1 is selected such that an image base pair IP1 is determined. When the image object I2 is fetched as the reference, the millimetric-wave object M2 is selected such that an image base pair IP2 is determined. When the image object I3 is fetched as the reference, the millimetric-wave object M5 is selected such that an image base pair IP4 is determined. When the image target object I4 is fetched as the reference, the millimetric-wave object M5 is selected such that an image base pair IP4 is determined. When the image object I5 is fetched as the reference, any one of the millimetric-wave target objects M1 to M5 cannot be selected to form the image base pair because each difference in the distance between the respective millimetric-wave objects M1 to M5, and the image object I5 exceeds the threshold value. When the image object I6 is fetched as the reference, any one of the millimetric-wave target objects M1 to M5 cannot be selected to form the image base pair because each difference in the distance between the respective millimetric-wave objects M1 to M5, and the image object I6 exceeds the threshold value.

The ECU 4 performs comparison between the millimetric-wave base pairs and the image base pairs sequentially so as to select the millimetric-base pair and the image base pair each including the identical millimetric-wave object and the image object. The ECU 4 further sets the selected combination of the millimetric-base pair and the image base pair each including the identical millimetric-wave object and the image object as a fusion pair (instantaneous fusion object). Then the information with respect to the distance and the relative speed derived from the millimetric-wave object data, and the information with respect to the angle derived from the image object data is set as the fusion object information.

In the example shown in FIG. 3, each of the millimetric-wave base pair MP1 and the image base pair IP1 includes the identical millimetric-wave object M1 and the image object I1, thus forming the fusion pair FP1. Each of the millimetric-wave base pair P2 and the image base pair IP2 includes the identical millimetric-wave object M2 and the image object I2, thus forming the fusion pair FP2. Each of the millimetric-wave base pair MP4 and the image base pair IP3 includes the identical millimetric-wave object M5 and the image object I3, thus forming the fusion pair FP3. The millimetric-wave base pair MP3 has no image base pair including the identical millimetric-wave object and the image object The image base pair IP4 has no millimetric-wave base pair including the identical millimetric-wave object and the image object.

Figure 4:
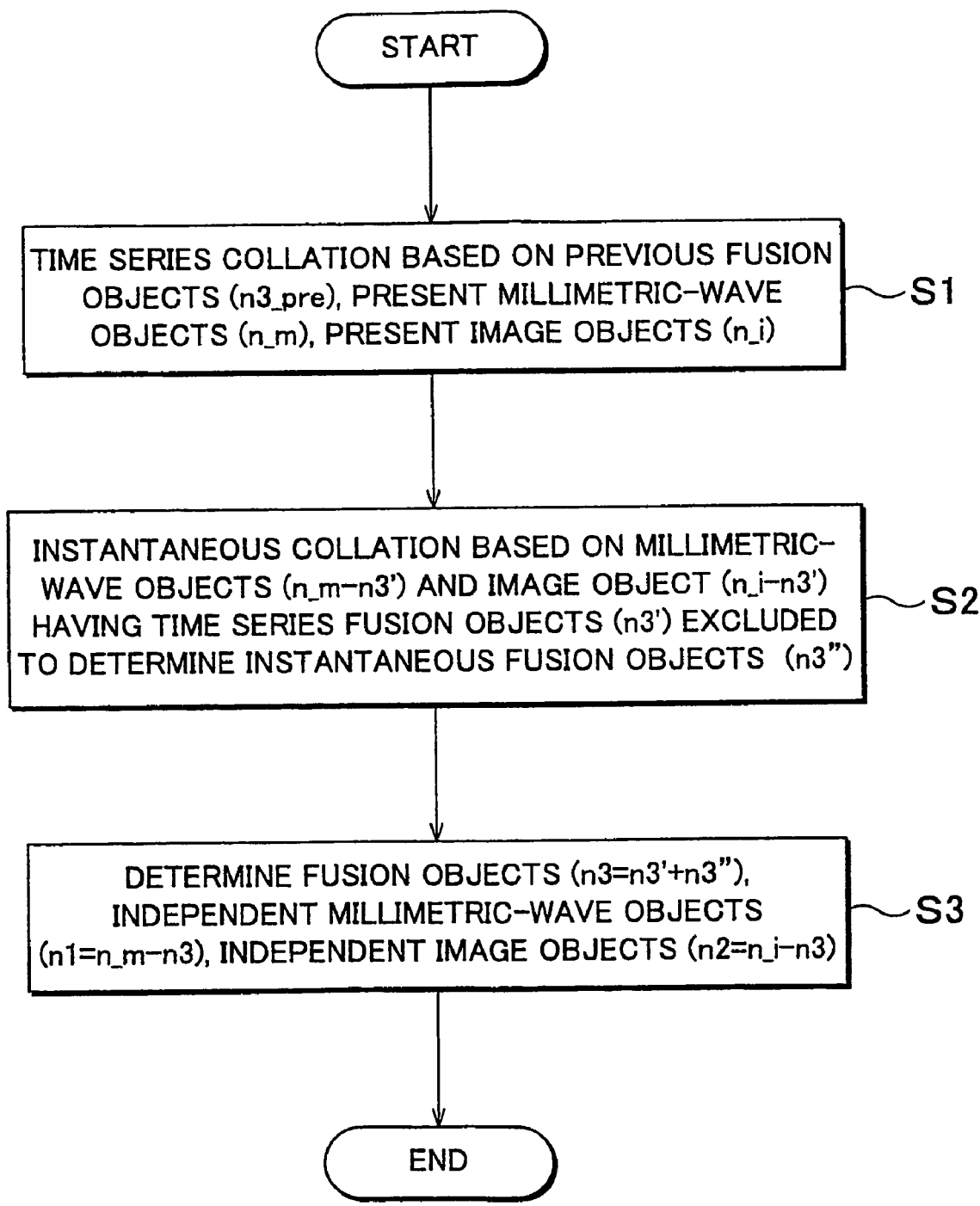
FIG. 4 is a flowchart representing a collating process executed in the obstruction detection system as shown in FIG. 1.
Figure 5:
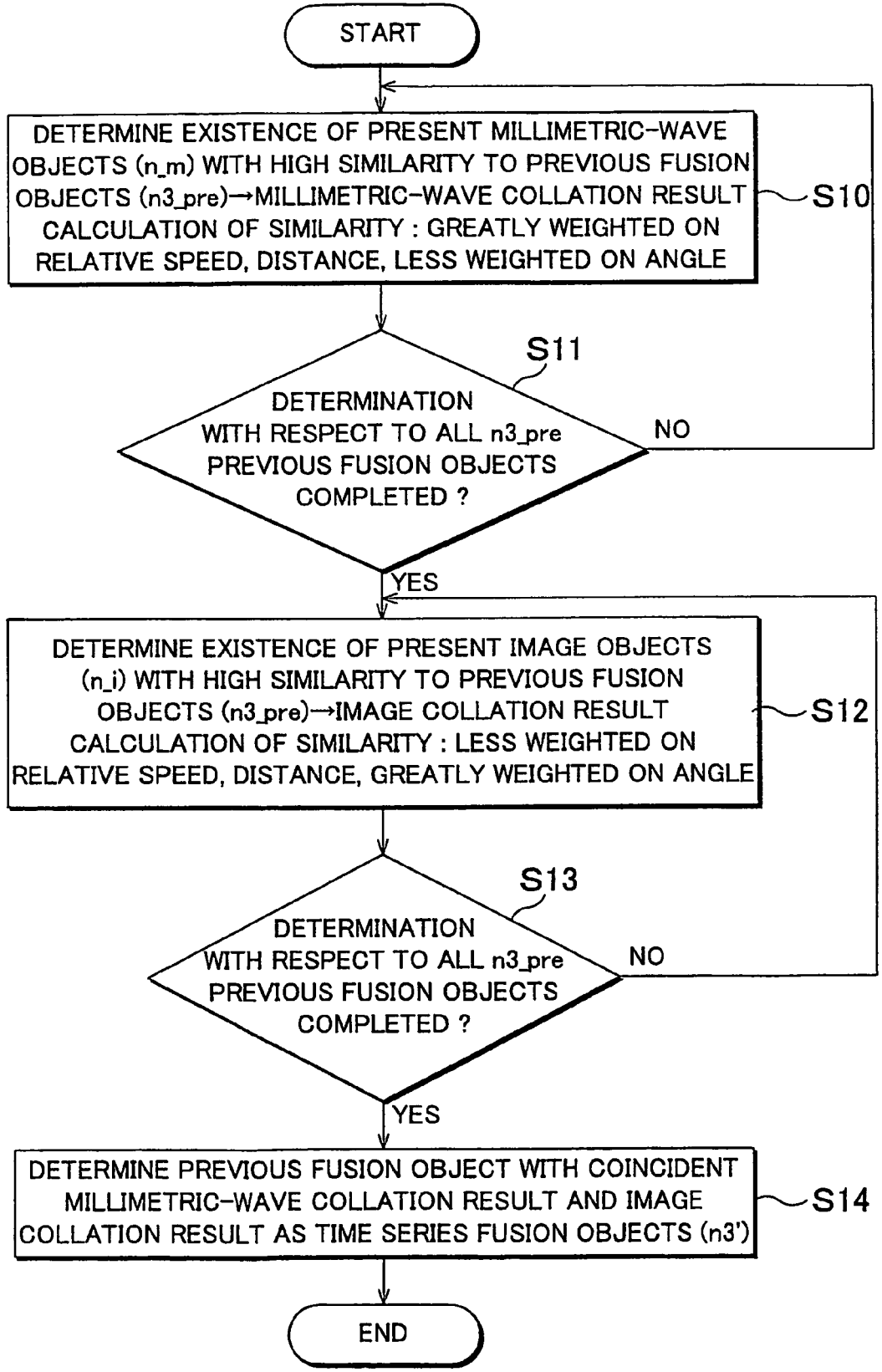
FIG. 5 is a flowchart representing a time-series collating process executed in the obstruction detection system as shown in FIG. 1.

The collation process performed in the obstruction detection system 1 will be described referring to FIG. 1. The collation process in general will be described referring to the flowchart of FIG. 4. The time-series collation process will be described referring to the flowchart of FIG. 5, and the instantaneous collation process will be described referring to the flowchart of FIG. 6, respectively. FIG. 4 is the flowchart representing the collation process performed in the obstruction detection system1 FIG. 5 is the flowchart representing the time-series collation process performed in the obstruction detection system. FIG. 6 is the flowchart representing the instantaneous collation process performed in the obstruction detection system.

The collation process in general will be described referring to the flowchart of FIG. 4. In the obstruction detection system 1, in step S1, millimetric-wave objects (n m) are intermittently detected by the millimeter-wave radar 2, and image objects (n i) are also intermittently detected by the stereo camera 3. In the obstruction detection system 1, the collation is executed at a predetermined time interval. If the result of the previous collation shows detection of the previous fusion objects (n3 pre), the previous fusion objects are time-series collated with respect to the present millimetric-wave objects (n m) and the present image objects (n i), respectively so as to determine the time-series fusion objects (n3'). As the number of the previous fusion objects in the first collation is zero, the time-series collation is not executed. When the number of the previous fusion objects is zero in the case other than the first collation, the time-series collation is not executed.

In step S2, the instantaneous collation is executed between the millimetric-wave objects derived from excluding the time-series fusion objects from the present millimetric-wave objects (n m–n3') and the image objects derived from excluding the time-series fusion objects from the present image objects (n i–n3') so as to determine the instantaneous fusion objects (n3"). If the number of the time-series fusion objects is zero, the instantaneous collation is performed between the present millimetric-wave objects (n m) and the present image objects (n i). If it is determined that each of the present millimetric-wave object and the present image object is identical to the previous fusion object, the instantaneous collation is not executed.

In the obstruction detection system 1, in step S3, the number of the time-series fusion objects is added to that of the instantaneous fusion objects to determine the fusion objects in the present collation (n3=n3'+n3"). Further the independent millimetric-wave objects (n1=n m–n3) and the independent image objects (n2=n i–n3) are determined respectively. In the obstruction detection system 1, the fusion objects, independent millimetric-wave objects, and image objects are determined at every collation process. The determined fusion objects serve as the previous fusion objects in the subsequent collation process.

The time-series collation process will be described referring to the flowchart of FIG. 5. In the obstruction detection system 1, it is determined whether the fusion object has been detected in the previous collation. If it is determined that the fusion object has been detected in the previous collation, the control proceeds to the following process.

In step S10, each similarity of n m present millimetric-wave objects to the previous fusion objects (n3 pre) weighted on the distance and the relative speed is calculated in the obstruction detection system 1. It is determined whether there is the millimetric-wave object having higher similarity (equal to or larger than the threshold value) to-the previous fusion object. If it is determined that there is the millimetric-wave object having higher similarity to the previous fusion object, the previous fusion object in reference to the millimetric-wave collation results is marked.

Then in step S11, it is determined whether all the determination with respect to n3 pre previous fusion objects has been completed. This step is executed repeatedly until completion of the determination. In the obstruction detection system 1, the previous fusion object that has been detected in the previous collation is searched among detection results of the millimeter-wave radar 2. If such previous fusion object is searched, it is considered to have high probability as being the present fusion object. Accordingly the searched previous fusion object is marked.

In step S12, calculation weighted on the angle is performed with respect to the similarity of each of n i present image objects to the previous fusion objects (n3 pre). It is then determined whether there is the image object with high similarity to the present fusion object, that is, the similarity value equal to or larger than the threshold value. If it is determined there is the image object having high similarity, the previous fusion object is marked.

The process proceeds to step S13 where it is determined whether the determination with respect to all the n3 previous fusion objects have been completed. The process in step S12 is repeatedly executed until completion of the determination with respect to all the previous fusion objects. In the obstruction detection system 1, existence of the previous fusion object that has been detected in the previous collation is searched among the detection results of the stereo camera 3. If the existence of the previous fusion object is searched, the searched previous fusion object is marked as it exhibits high probability of being the present fusion object.

In step S14, comparison is made between the millimetric-wave objects collation results and the image objects collation results so as to determine the previous fusion objects (n3') that have been marked in both the millimetric-wave object and the image object collation results as the time-series fusion objects (n3'). Then the information of the time-series fusion objects (distance, relative speed, angle) is set. In the obstruction detection system 1, results of collation between the previous fusion objects and the present millimetric-wave objects, and between the previous fusion objects and the present image objects, that is, (millimetric-wave objects collation results and image objects collation results) are compared bilaterally. The previous fusion object that is marked both in those two collation results is determined as the object to be detected by the obstruction detection system 1.

The process for executing the instantaneous collation will be described referring to the flowchart of FIG. 6. In the case where the time-series fusion object is detected by the time-series collation, the time-series fusion objects are excluded from the present millimetric-wave objects, that is, n m−n3' millimetric-wave objects are subjected to the instantaneous collation, and the time-series fusion objects are excluded from the present image objects, that is, n i−n3' image objects are subjected to the instantaneous collation. In the case where no time-series fusion object is detected, the present millimetric-wave objects and the present image objects are subjected to the instantaneous collation.

In step S20, each of (n i−n3') image objects is collated with respect to each of the millimetric-wave objects as the reference respectively in the obstruction detection system 1. Then the image object that is closest to the reference millimetric-wave object is selected. If each of the difference in the distance and the angle between the reference millimetric-wave object and the selected image object is equal to or smaller than each of the respective threshold values, the millimetric-wave base pair including the reference millimetric-wave object and the image object closest thereto is determined.

Then in step S21, it is determined whether determination with respect to all the (n m−n3') millimetric-wave objects has been completed in the obstruction detection system 1. This process in step S20 is repeatedly executed until completion of the aforementioned determination. In the obstruction detection system 1, each of detection results of the stereo camera 3 is collated with respect to the millimeter-wave radar 2 so as to search one image object that is the highest probability as being closest to the respective millimetric-wave object.

In step S22, each of (n m−n3') millimetric-wave objects is collated with respect to each of the image objects as the reference in the obstruction detection system 1. Then the millimetric-wave object that is closest to the reference image object is selected. If each of the difference in the distance and the angle between the reference image object and the selected millimetric-wave object is equal to or smaller than each of the respective threshold values, the image base pair including the reference image object and the millimetric-wave object that is closest thereto are determined.

In step S23, it is determined whether the collation with respect to all the (n i−n3') image objects has been completed in the obstruction detection system 1. The process in step S22 is repeatedly executed until completion of the collation with respect to all the image objects. In the obstruction detection system 1, the detection results of the millimeter-wave radar 2 is searched in reference to the detection results of the stereo camera 3 so as to determine only one millimetric-wave object having highest probability as being closest to the image object.

In step S24, collation is performed between all the millimetric-wave base pairs and all the image base pairs that have been determined so as to search the millimetric-wave base pair and the image base pair each including the identical millimetric-wave object and the image object. In the obstruction detection system 1, when the millimetric-wave base pair and the image base pair each having the identical millimetric-wave object and the image object are searched, the identical millimetric-wave object and the image object are determined as being the fusion pair.

In step S25, among those fusion pairs, the instantaneous fusion objects (n3") are determined, and the information of the instantaneous fusion object (distance, relative speed, angle) is set In the obstruction detection system 1, comparison is made between the bilateral collation results in reference to the millimetric-wave objects and the image objects, that is, millimetric-wave base pair and the image base pair. Only when those millimetric-wave base pair and the image base pair have the identical millimetric-wave object and the image object, such objects are determined as the fusion objects.

In the obstruction detection system 1, the previous collation result is used for the time-series collation. This makes it possible to realize stable collation in comparison with the collation between those objects each changes time by time. Even in the case where the object to be detected by the obstruction detection system 1 cannot be identified by collating the detection results, the above-described process is capable of identifying the object. In the case where the detection accuracy in the millimeter-wave radar 2 or the stereo camera 3 is temporarily deteriorated owing to noise or electric wave hindrance, the collation can be made with less possibility of failing to identifying the object to be detected. The similarity is determined such that each parameter with higher accuracy of the millimeter-wave radar 2 and the stereo camera 3 is weighted. The resultant detection accuracy, thus, is relatively higher.

In the instantaneous collation executed in the obstruction detection system 1, millimetric-wave objects and the image objects are bilaterally collated. Only in the case of coincidence in the collation results, it is determined that the fusion object exists. The accuracy (fusion accuracy) for determining with respect to coincidence between objects detected by the image and detected by the millimetric-wave is substantially high. In the obstruction detection system 1, one object either the millimetric-wave object or the image object, which is closest to the other object is selected. The collation is performed by searching coincidence among those pairs of the millimetric-wave base pair and the image pair. The resultant processing load is relatively low. In the obstruction detection system 1, the object that has not been detected by the previous collation may be identified as being the fusion object in accordance with the present detection results.

In the obstruction detection system 1, the detection results of the image of the vehicle running ahead and the millimetric-wave detection results may be collated so as to supply obstruction information having high reliability to various types of operation support systems. This makes it possible to support the vehicle operator with appropriate operation.

As has been described with respect to the embodiment of the invention, it is to be understood that the invention is not limited to the aforementioned embodiment but may be embodied into various forms.

The embodiment of the invention is applied to the obstruction detection system equipped for the vehicle. It may be applicable to various types of object detection, for example, contact-free detection.

The embodiment of the invention includes two types of detection units, that is, the millimeter-wave radar and the stereo camera However, any other detection unit such as a laser radar may be employed. Further three or more detection units may also be employed.

In the embodiment of the invention, the position of each object is identified based on the distance, relative speed, and angle. However, other information such as two-dimensional coordinate system may be used for identifying the position of the respective objects.

In the time-series collation according to the embodiment, the object that coincides in the collations between the previous fusion objects and the present millimetric-wave objects and between the previous fusion objects and the present image objects may be set as the time-series fusion object The object that is coincided with the previous fusion object in one of those collations may be set as the time-series fusion object.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. An object detection system comprising:
a radar detection unit that detects an object using a radar;
an image detection unit that detects an object using an image; and
a collating unit that performs a present collation between a detection result of the radar detection unit and a detection result of the image detection unit so as to determine whether an identical object is detected by the radar detection unit and the image detection unit; wherein
the collating unit performs a first collation between an object detected by the radar detection unit in a present radar detection and a previous fusion object that has been determined as being detected by the radar detection unit and the image detection unit in a previous collation, performs a second collation between an object detected by the image detection unit in a present image detection and the previous fusion object, and determines whether the radar detection unit and the image detection unit detect the identical object in the present collation based on the first and the second collations.

2. The object detection system according to claim 1, wherein the collating unit performs a third collation between objects detected by the radar detection unit in the present detection, which are obtained by excluding the object determined as have been detected by the radar detection unit and the image detection unit, and objects detected by the image detection unit in the present detection, which are obtained by excluding the object determined as having been detected by the radar detection unit and the image detection unit such that it is determined whether the identical object is detected by the radar detection unit and the image detection unit.

3. The object detection system according to claim 2, wherein the collating unit determines all fusion objects in the present collation by adding the number of fusion objects determined based on the first and second collation to that of the fusion objects determined based on the third collation to determine all fusion objects in the present collation, and the collating unit determines all independent objects in the present collation by excluding the fusion objects from the objects detected by the radar detection unit or the image detection unit in the present detection.

4. The object detection system according to claim 1, wherein the radar detection unit comprises at least one of a millimeter-wave radar and a laser radar.

5. The object detection system according to claim 2, wherein the radar detection unit comprises at least one of a millimeter-wave radar and a laser radar.

6. The object detection system according to claim 3, wherein the radar detection unit comprises at least one of a millimeter-wave radar and a laser radar.

7. The object detection system according to claim 1, wherein the image detection unit comprises a stereo camera.

8. The object detection system according to claim 2, wherein the image detection unit comprises a stereo camera.

9. The object detection system according to claim 3, wherein the image detection unit comprises a stereo camera.

10. The object detection system according to claim 4, wherein the image detection unit comprises a stereo camera.

11. A method of detecting an object in a system including
a radar detection unit that detects an object using a radar;
an image detection unit that detects an object using an image; and
a collating unit that performs a present collation between a detection result of the radar detection unit and a detection result of the image detection unit so as to determine whether an identical object is detected by the radar detection unit and the image detection unit, the method comprising the steps of:
performing a first collation between an object detected by the radar detection unit in a present radar detection and a previous fusion object that has been determined as being detected by the radar detection unit and the image detection unit in a previous collation;
performing a second collation between an object detected by the image detection unit in present image detection and the previous fusion object; and
determining whether the radar detection unit and the image detection unit detects the identical object in the present collation based on the first and the second collations.

12. The method according to claim 11, further comprising the step of
performing a third collation between objects detected by the radar detection unit in the present detection, which are obtained by excluding the object determined as having been detected by the radar detection unit and the image detection unit, and objects detected by the image detection unit in the present detection, which are obtained by excluding the object determined as having been detected by the radar detection unit and the image detection unit such that it is determined whether the identical object is detected by the radar detection unit and the image detection unit.

13. The method according to claim 12, further comprising the steps of
adding the number of fusion objects determined based on the first and second collations to that of the fusion objects determined based on the third collation to determine all fusion objects in the present collation; and excluding the fusion objects from the objects detected by the radar detection unit or the image detection unit in the present detection to determine all independent objects in the present collation.

14. The method according to claim 11, wherein the radar detection unit comprises at least one of a millimeter-wave radar and a laser radar.

15. The method according to claim 12, wherein the radar detection unit comprises at least one of a millimeter-wave radar and a laser radar.

16. The method according to 13, wherein the radar detection unit comprises at least one of a millimeter-wave radar and a laser radar.

17. The method according to claim 11, wherein the image detection unit comprises a stereo camera.

18. The method according to claim 12, wherein the image detection unit comprises a stereo camera.

19. The method according to claim 13, wherein the image detection unit comprises a stereo camera.

20. The method according to claim 14, wherein the image detection unit comprises a stereo camera.

* * * * *

UNITED STATES PATENT AND TRADEMARK OFFICE
CERTIFICATE OF CORRECTION

PATENT NO. : 7,417,580 B2 Page 1 of 1
APPLICATION NO. : 10/571427
DATED : August 26, 2008
INVENTOR(S) : Kyoichi Abe et al.

It is certified that error appears in the above-identified patent and that said Letters Patent is hereby corrected as shown below:

Claim 11, col. 14, line 46, "in present" should read --in the present--.

Claim 16, col. 16, line 1, "to 13," should read --to claim 13--.

Signed and Sealed this

Sixteenth Day of December, 2008

JON W. DUDAS
*Director of the United States Patent and Trademark Office*